United States Patent
Klotz Rabello

(10) Patent No.: US 12,522,553 B2
(45) Date of Patent: Jan. 13, 2026

(54) INTEGRATED PRODUCTION PROCESS OF TERT-BUTYL ETHERS OF GLYCEROL OR ISOOCTENE STREAM

(71) Applicant: Petróleo Brasileiro S.A.—Petrobras, Rio de Janeiro (BR)

(72) Inventor: Carlos Rene Klotz Rabello, Rio de Janeiro (BR)

(73) Assignee: Petróleo Brasileiro S.A.—Petrobras, Rio de Janeiro (BR)

(*) Notice: Subject to any disclaimer, the term of this patent is extended or adjusted under 35 U.S.C. 154(b) by 657 days.

(21) Appl. No.: 17/959,784

(22) Filed: Oct. 4, 2022

(65) Prior Publication Data
US 2023/0104664 A1    Apr. 6, 2023

(30) Foreign Application Priority Data
Oct. 6, 2021 (BR) .................. 10 2021 020125 8

(51) Int. Cl.
| | | |
|---|---|---|
| *B01D 3/04* | (2006.01) | |
| *B01D 3/14* | (2006.01) | |
| *B01D 11/04* | (2006.01) | |
| *C07C 41/09* | (2006.01) | |
| *C07C 41/42* | (2006.01) | |

(52) U.S. Cl.
CPC ............. *C07C 41/09* (2013.01); *B01D 3/14* (2013.01); *B01D 11/0492* (2013.01); *C07C 41/42* (2013.01)

(58) Field of Classification Search
CPC ........... C07C 41/09; C07C 41/42; B01D 3/14; B01D 11/0492
See application file for complete search history.

(56) References Cited

U.S. PATENT DOCUMENTS

| | | | | |
|---|---|---|---|---|
| 4,252,541 A | * | 2/1981 | Herbstman | C10L 1/1852 44/449 |
| 5,108,719 A | * | 4/1992 | Harandi | C07C 41/06 422/187 |

(Continued)

FOREIGN PATENT DOCUMENTS

WO    2017105246 A2    6/2017

OTHER PUBLICATIONS

Behr et al. (Jul. 1, 2002) "Development of a Process for the Acid-catalyzed Etherification of Glycerine and Isobutene Forming Glycerine Tertiary Butyl Ethers", Engineering in Life Sciences, 2(7):185-189.

(Continued)

*Primary Examiner* — Jonathan Miller
(74) *Attorney, Agent, or Firm* — Morrison & Foerster LLP

(57) ABSTRACT

The present invention relates to an integrated process that allows the production of tert-butyl ethers of glycerol, used as a high boiling point solvent (HBPS) in paint formulations (water-based) and cleaning products, or a stream of isooctenes to be used as an octane in the gasoline pool, in a simple way, just directing the flow through the areas necessary for the conversion and separation of the process and using the same equipment, aiming at gains in process yield (Continued)

(maximization of glycerol and isobutene conversions) and minimizing investment and operating costs. In view of this, there is a unit flexibility in producing different high added value products.

11 Claims, 3 Drawing Sheets

(56) References Cited

U.S. PATENT DOCUMENTS

| | | | | |
|---|---|---|---|---|
| 5,132,467 | A * | 7/1992 | Haag | C07C 41/06 |
| | | | | 568/697 |
| 5,476,971 | A * | 12/1995 | Gupta | C07C 41/06 |
| | | | | 568/619 |
| 5,536,887 | A * | 7/1996 | Minkkinen | C07C 41/42 |
| | | | | 568/697 |
| 6,072,095 | A * | 6/2000 | Marion | C07C 11/02 |
| | | | | 585/642 |
| 8,188,327 | B1 * | 5/2012 | Bakshi | C07C 5/03 |
| | | | | 585/277 |
| 8,492,597 | B2 * | 7/2013 | Rabello | C07C 29/60 |
| | | | | 568/861 |
| 8,735,640 | B2 * | 5/2014 | Cohen | C10G 3/42 |
| | | | | 585/324 |
| 9,422,205 | B2 * | 8/2016 | Brianti | C07C 41/06 |
| 11,505,512 | B2 * | 11/2022 | Almering | B01J 8/065 |
| 11,623,906 | B2 * | 4/2023 | Barias | B01D 3/009 |
| | | | | 568/697 |
| 2012/0010451 | A1 * | 1/2012 | Di Girolamo | C07C 41/06 |
| | | | | 585/324 |
| 2024/0140885 | A1 * | 5/2024 | Wagner | C07C 7/005 |
| 2024/0351963 | A1 * | 10/2024 | Barias | B01D 3/009 |

OTHER PUBLICATIONS

Cavalcante et al. (2014) "Qualitative Chromatographic Methods and Quantitative Analysis of Glycerin Tert-butylation Products", Virtual Journal of Chemistry, 6(2):244-257.
Di Serio et al. (Feb. 16, 2010) "New Process for the Production of Glycerol Tert-butyl Ethers", Energy & Fuels, 24(9):4668-4672.
Frusteri et al. (Oct. 1, 2009) "Catalytic Etherification of Glycerol by Tert-butyl Alcohol to Produce Oxygenated Additives for Diesel Fuel", Applied Catalysis a: General, 367(1-2):77-83.
Jamróz et al. (Jul. 2007) "Mono-, Di-, and Tri-tert-butyl Ethers of Glycerol: a Molecular Spectroscopic Study", Spectrochimica Acta Part a: Molecular and Biomolecular Spectroscopy, 67(3-4):980-988.
Klepáčová et al. (Aug. 31, 2007) "Etherification of Glycerol and Ethylene Glycol by Isobutylene", Applied Catalysis a: General,328(1):1-13.
Liu et al. (Mar. 15, 2014) "Liquid-liquid Equilibrium for Systems of Glycerol and Glycerol Tert-butyl Ethers", Fluid Phase Equilibria, 365:50-57.
Vlad et al. (Dec. 5, 2012) "Design and Control of Glycerol-tert-butyl Alcohol Etherification Process", The Scientific World Journal, 2012:1-11.
Vlad et al. (Apr. 20, 2011) "Design of Glycerol Etherification Process by Reactive Distillation", Journal of Italian Association of Chemical Engeering, 25:779-784.

* cited by examiner

INTEGRATED PRODUCTION PROCESS OF TERT-BUTYL ETHERS OF GLYCEROL OR ISOOCTENE STREAM

CROSS-REFERENCE TO RELATED APPLICATION

This application claims priority to Brazilian Application No. 10 2021 020125 8 filed on Oct. 6, 2021, and entitled "INTEGRATED PRODUCTION PROCESS OF TERT-BUTYL ETHERS OF GLYCEROL OR ISOOCTENE STREAM" the disclosure of which is incorporated herein by reference in its entirety.

FIELD OF THE INVENTION

The present invention relates to an integrated production process of tert-butyl ethers of glycerol for use as a high boiling point solvent (HBPS) or a stream of isooctenes to be used as octane booster in the gasoline pool, aiming at performance gains from process (conversion of glycerol and isobutene) and minimization of investment and operational costs.

DESCRIPTION OF THE STATE OF THE ART

Streamly, there are few publications involving the synthesis of glycerol tert-butyl ethers (GTBE) in the literature. The existing processes have different configurations in terms of reactor type (mixing) and the step of separating the product (extraction with glycerol), which provide lower yields. FIG. 1 summarizes the chemical reactions involved in the synthesis process.

One of the first and most important publications was the U.S. Pat. No. 5,476,971 (1995) "Glycerine di-Tertiary Butyl Ether Preparation" (Arch Chemical Technology) that addresses the di-GTBE production process, in which the glycerol and isobutene are fed into a CSTR-type reactor with the homogeneous catalyst p-toluenesulfonic acid or methanesulfonic acid, receiving the unreacted isobutene recycle streams from the rectifier column, and a stream of glycerol and mono-GTBE, coming from the decanter. The reactor effluent is sent to a decanter to separation of the dense phase, recycled to the reactor, and the light phase, directed to the rectifier column for isobutene recovery. The botton130391499v.1 stream of grinding column is routed to an extraction column for removal of glycerol and mono-GTBE and obtaining the product basically composed of di- and tri-GTBE.

In terms of advantage, it can be highlighted the fact that this configuration eliminates the distillation of mono-GTBE and glycerol from the product of interest. This is a difficult separation that requires a considerable amount of theoretical and under vacuum stages to avoid degradation of the ethers present. However, there is loss of glycerol, mono-GTBE and the homogeneous acid catalyst in the washing water which must be subsequently treated before discarded.

Also, the tert-butyl-alcohol formed (TBA), as well as eventual formation of isobutene dimers and trimers, will concentrate and contaminate the product stream.

The work of BEHR, A.; OBENDORF, L. (2002) "Development of a process for the acid-catalyzed etherification of glycerine and isobutene forming glycerine tertiary butyl ether", Engineering in Life Sciences, volume 2, pages 185 to 189, that addresses an alternative process setup to produce a stream of di-GTBE, aims to use the product as an octane booster. The process described involves 3 CSTR reactors in series in the reaction section, alleging that there is phase formation, and the agitation would increase the mass transfer. It uses pure isobutene and glycerol is added later in the extraction section L-L, aiming at the extraction of the mono-GTBE formed that are recycled to the $1^{st}$ reactor. The di- and tri-GTBE stream together with the isobutene is sent to a flash vessel, where the isobutene is removed in the vapor phase, condensed and recycled to the $1^{st}$ reactor. A final rectification column removes the product through the top and residual mono-GTBE and glycerin from the stream are removed through the bottom stream, which is also recycled to the $1^{st}$ reactor.

Several catalysts were tested, but the homogeneous catalysis with phosphorotungstic acids ($H_3PW_{12}O_4$) and p-toluenesulfonic acid (pTS), both soluble in glycerol, showed the best performance. This way, the entire kinetic study, carried out in a batch reactor in a bench, was modelled on the pTS that had the highest yield of dieters.

It alleges that isobutene dimers and trimers were not formed and, therefore, there was no need for additional feeding of water or tert-butyl-alcohol (TBA) to increase process selectivity. TBA has been detected in contents lower than 1% w/w in the effluent, resulting from the water present in the medium. This TBA must be removed together with the product, having its concentration. Isobutene dimers and trimers that may be, eventually formed will also be collected with the product. However, it is not mentioned in the article if there are catalyst losses in the product stream or even its deactivation.

This process configuration adds advantages such as recovery of the mono-GTBE stream and residual glycerol in the product through distillation, increasing the final yield and the addition of glycerol directly to the decanter to improve extraction performance.

KLEPÁCOVÁ, K. et al. (2007) "Etherification of glycerol and ethylene glycol by isobutylene", Applied Catalysis A: General, volume 328, pages 1 to 13 made a comparative study of glycerol etherification using ethylene glycol and isobutene with Amberlyst-15 and Amberlyst-35, pTS and H-Y and H-Beta zeolites. The biggest yield in di- and tri-GTBE was obtained with the resins, while the highest glycerol conversion was obtained with H-Beta zeolite. In this case, the formation of tri-GTBE was very low, alleging to be due to the pore size of the catalyst. Furthermore, it was concluded that zeolites are more susceptible to deactivation, not being suitable for this type of reaction. The etherification of glycerol with ethylene glycol proved to be easy at 60° C. For one good performance of pTS, several solvents were used, the sulfonant being the most appropriate.

The article by FRUSTERI, F. et al. (2009) "Catalytic etherification of glycerol by tert-butyl alcohol to produce oxygenated additives for diesel fuel", Applied Catalysis A: General, volume 367, pages 77 to 83, discusses the synthesis of GTBE using glycerol and tert-butanol as reagents in batch reactor. Some catalysts were tested, and the highest glycerol conversion was achieved with Amberlyst-15 resin. The study with this catalyst was continued with the aim of verify the influence of process variables. Furthermore, this article mentions the fact that it did not form isobutene dimers or trimers.

The article by DI SERIO et al. (2010) "New process for the Production of Glycerol tert-Butyl Ethers", Energy Fuels, volume 24, pages 4668 to 4672, addresses a integrated process configuration, starting from glycerol and isobutene, in a CSTR-type reactor, using Amberlyst-15 resin as a catalyst. The effluent of reactor is directed to a flash vessel F1 (73° C., 0.1 bar) for vaporization of hydrocarbons (isobutene and its dimers and trimers), maintaining the GTBE formed and glycerol in the bottom liquid stream. The gas stream goes to a second flash vessel F2 (25° C., 0.1 bar), for condensation of the dimers and trimers (used as gasoline) and the isobutene obtained in the top gas stream is recycled to the reactor. The bottom stream from F1 is sent to a 6-stage extraction column where the solvent is biodiesel (FAME), obtaining a mixture of biodiesel, GTBE and glycerol above the specification allowed. The authors mention that this glycerol can be removed with aqueous washing, generating a complication and an increase in cost for the suggested configuration. The advantage of this process is based on the fact that it uses distillation columns to obtain GTBE (made by extraction with biodiesel), however, cannot be inferred if these lower CAPEX and OPEX are offset by equipment added to specify biodiesel in terms of glycerol.

VLAD, E. et al. (2011) "Design of Glycerol Etherification Process by Reactive Distillation", Chemical Engineering Transactions, volume 25, pages 779 to 784, made a simulation work of the GTBE production process based on data available in the literature using reactive distillation column and its variations. The conversions obtained were 80% for glycerol and 55% for isobutene, which were fed in the isobutene/glycerol molar ratio equal to 4. There was a large formation of mono-GTBE that is recycled to the reaction system and the addition of glycerol in the settling vessel increases the extraction of mono-GTBE. In another work by VLAD et al. (2012) "Design and Control of Glycerol-tert-Butyl Alcohol Etherification Process", The Scientific World Journal, volume 2012, pages 1 to 11, they describe different process configurations aiming to maximize yield.

WO 2017/105246 A2 "GTBE Composition, Methods and Installations for Enhanced Octane Boosting" does not show a configuration of specific process for GTBE production, being used as octane booster. It mentions unit operations to reach certain levels of components in steams, but there are no drawings showing this configuration. The tests are carried out in a batch reactor, using sulfuric acid as a catalyst, but mentions that heterogeneous catalysts can be used.

As other minor bibliographic references can be mentioned the article by JAMRÓZ, M. E. et al. (2007) "Mono-, di-, and tri-tert-butyl ethers of glycerol: A molecular spectroscopic study", Spectrochimica Acta Part A: Molecular and Biomolecular Spectroscopy, volume 67, pages 980 to 988, which makes a molecular spectroscopy study with GTBE, showing the more stable compounds among the mono and di-GTBE families.

CAVALCANTE et al. (2014) "Qualitative Chromatographic Methods and Quantitative Analysis of Glycerin Tert-butylation Products", Virtual Journal of Chemistry, volume 6 (2), pages 244 to 257, addresses the development of methodology for chromatographic analysis of GTBE, presenting typical factors of response, chromatographic conditions and retention time of the components.

The authors LIU et al. (2014) "Liquid-liquid equilibrium for system of glycerol and glycerol tert-butyl ethers", Fluid Phase Equilibria, volume 365, pages 50 to 57, carried out a more detailed study on the L-L thermodynamic equilibrium of the glycerol and its ethers (GTBE), in ternary diagrams, using the NRTL model and 3 variations of the UNIFAC model. The solubility of GTBE in glycerol decreases with increasing degree of tert-butyl groups. Temperature moderately influences the solubilities of GTBE in glycerol. The coefficients of NRTL model activity correlated well with the experimental data and the corresponding binary interaction parameters have been resolved. However, the UNIFAC-original, UNIFAC-LLE and UNIFAC-Dortmund model failed to predict this system.

In order to solve such problems, the present invention, through the use of fixed bed reactors under optimized operational and process configuration for high recovery of product and yields, in which the process allows the production of glycerol tert-butyl ethers to be used as a high boiling point solvent or a stream of isooctenes to be used as octane booster in the gasoline pool.

The present invention has advantages in the valuation of the C4 cut from the FCC (Fluid Catalyst Cracking) process, Delayed Coking and/or Steamcracking process as a high added value solvent, renewable alternative solvent production to paints and cleaning products. Furthermore, the process allows to obtain a product of greater purity.

BRIEF DESCRIPTION OF THE INVENTION

The present invention relates to an integrated process composed of the load washing, reaction, product separation and product purification, allowing the production of glycerol tert-butyl ethers (GTBE) to be used as a high boiling point solvent (HBPS) with minimum of 95% w/w of di- and tri-substituted glycerol tert-butyl ethers to be used in paint formulations (water-based) and cleaning products or alternative production of an isooctene stream to be used as octane booster in the gasoline pool.

The design and sizing of process equipment of the present invention aim to allow the production of tert-butyl ethers or the stream of isooctenes in a simple way, just directing the flow through the areas required for conversion and separation of process streams.

BRIEF DESCRIPTION OF THE DRAWINGS

The present invention will be described in more detail below, with reference to the attached figures which, in a schematic and non-limiting manner of the inventive scope, represent examples of its realization. In the drawings, there are.

DETAILED DESCRIPTION OF THE INVENTION

Figure 1:
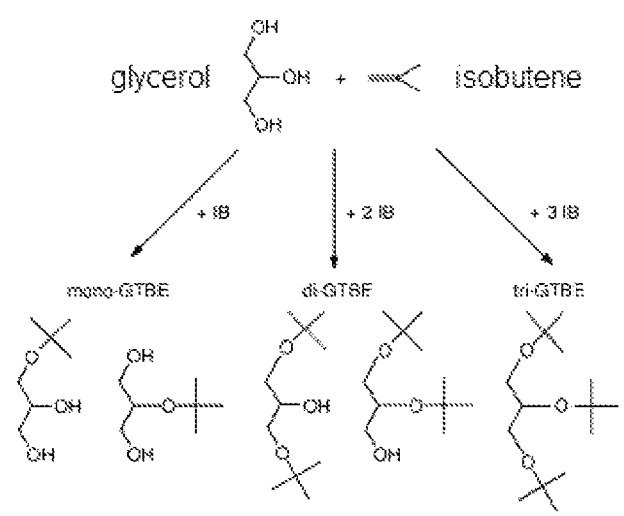
FIG. 1 illustrating isobutene and glycerol etherification reactions for production of glycerol tert-butyl mono-/di-/tri-ethers (GIBE)
Figure 2:
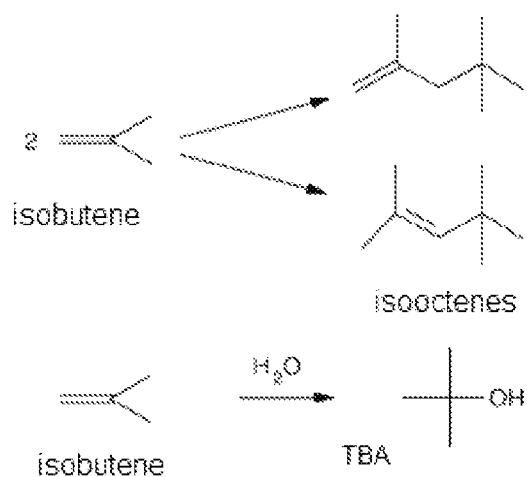
FIG. 2 illustrating dimerization and trimerization reactions of the isobutene and TBA formation.
Figure 3:
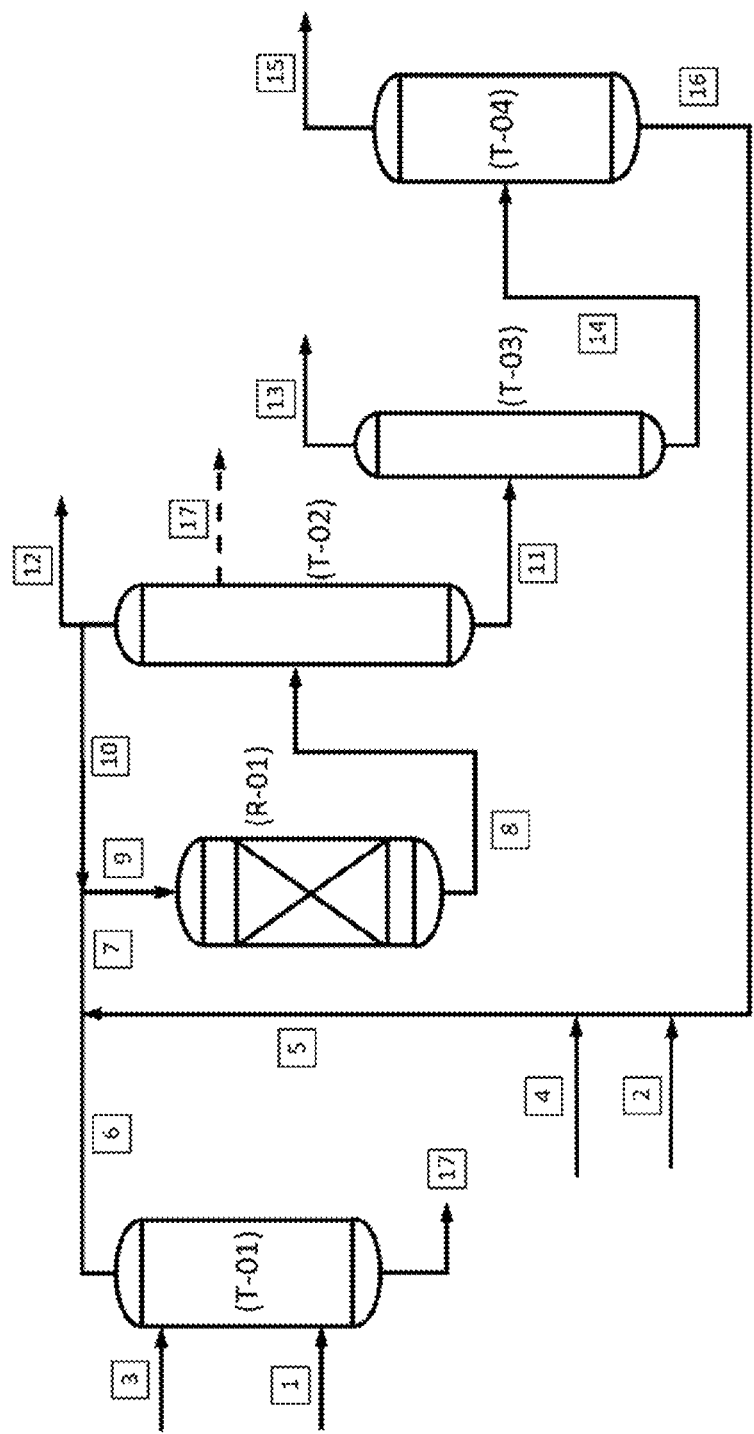
FIG. 3 illustrating a schematic of the HBPS and ISOOCTENES production process.

The integrated process, according to the present invention and illustrated in FIG. 3, involves the production of a stream of glycerol ethers formed by etherification of glycerol in 2 or 3 positions with isobutene present in the olefinic C4 cut. The olefinic C4 cut may come from an FCC (Fluid Catalytic Cracking) unit, delayed coking (Delayed Coking) unit or steam pyrolysis (Steamcracking). The process aims to produce a product stream with minimal content of di- and tri-substituted ethers of 95% w/w, which can be used as a high boiling point solvent (HBPS). Due to the similarities between the ether stream production processes and the isobutene dimerization process to produce a stream of isooctenes, the proposed configuration allows, in simple way, switch production between solvent production and isooctane production. FIG. 1 presents a simplified process schema proposed for a production unit that will be called as a hybrid unit. The glycerol tert-butyl ether stream is called HBPS (High Boiling Point Solvent). Glycerol tert-butyl ethers are called mono-, di- and tri-GTBE (Glycerol Terc-Butyl Ethers) according to the number of tert-butyl groups present in the molecule.

The process can be divided into 4 distinct sections: (A) load washing; (B) conversion section; (C) product separation section; (D) HBPS fractionation section.

Description of the HBPS Stream Production Process:

The olefinic C4 cut (1) is admitted from the bottom of the washing tower (T-01) of the load washing section and undergoes counter-current extraction with demineralized water (3) admitted from the top in order to remove basic compounds (for example, acetonitrile) and cations (for example, $Na^+$) present for levels below 1 mg/kg. At the bottom of the washing tower (T-01) the oily water (17) from the extraction that is sent to the organic effluent treatment and through the top the washed C4 cut (6) is obtained, which is directed to the conversion reactor (R-01) in the conversion section, containing acid ion exchange resin. The washed C4 receives the recycle stream from the bottom (5) of the product separation tower (T-02), containing mono-GTBE and unconverted glycerol, and water used as a reaction moderating agent, generating the supply stream (7) of the conversion reactor (R-01). Alternatively, the unreacted C4 stream (10) from the top of the product separation tower (T-02) can be recycled to the conversion reactor (R-01), generating the supply stream (9) of the conversion reactor (R-01). This practice aims at additional temperature control or an increase in the overall conversion of isobutene. Otherwise, the composition of streams (7) and (9) will be identical. It should be noted that this practice is mandatory and dependent on the isobutene content, aiming at the control of reactor temperature only when the unit operates in production of isooctenes.

In the conversion reactor (R-01) the etherification reactions of glycerol with isobutene forming GIBE (mono-, di- and tri-tert-butyl ethers) occur and, concomitantly, in a much smaller amount, the formation of dimers (isooctenes) and trimers (isododecenes) of isobutene, in addition to tert-butanol (TBA—Tert-Butyl-Alcohol), as a moderating agent of the reaction, by the reaction of isobutene hydration. Alternatively, the unit can operate with more than one reactor in series, in order to maximize the conversion of glycerol and isobutene.

The effluent from the reactor (8) is sent to the product separation tower (T-02), which operates pressurized in the range of 2 to 8 bar, where at the bottom a stream (11) containing the formed products is withdrawn; this stream is sent to the gasoline splitter tower (T-03), still in the product separation section. The top stream (12) of the product separation tower (T-02) is composed of the unreacted C4 hydrocarbons that are intended for storage in LPG spheres or, alternatively, recycled to the conversion reactor (R-01) for temperature control of the bed or to maximize overall isobutene conversion. From the top of the gasoline splitter tower (T-03) the stream (13) composed of the dimers and trimers of isobutene and the TBA (isooctene stream), usually sent to the gasoline pool or marketed as an octane booster or special gasoline. Alternatively, if HBPS does not require high purity (less than 95%), the gasoline splitter tower (T-03) may leave operation and the isooctene stream will be recovered as a side stream (17) of the product separation tower (T-02). From the bottom of the gasoline splitter tower (T-03), the stream (14), containing the product of interest, goes to the purification (T-04). This tower operates under vacuum in order to limit the bottom maximum temperature, preventing the decomposition of the ethers formed and the glycerol not converted. The stream (16) withdrawn from the bottom of the purification tower (T-04), containing the formed mono-GTBE and unreacted glycerol, is recycled to the conversion section. Along with this stream (16), the glycerol (2) of the process and demineralized water (4) are fed aiming at the production of TBA in the reactor and increase the selectivity of the reaction by inhibiting the dimerization and trimerization reactions of isobutene. The stream (5) is the result of mixing the recycle stream (16) from the bottom of the purification tower (T-04) with the glycerol (2) and water (4) streams. The resulting stream (5) joins the stream (6), corresponding to the washed C4 cut obtained from the top of the washing tower (T-01), feeding the conversion reactor (R-01). Finally, the stream (15) from the top of the purification tower (T-04), containing a minimum of 95% w/w of di- and tri-GTBE, considered the product (HBPS), will be sent for storage in tanks before being marketed.

The advantages of the configuration of the process of the present invention in relation to the processes in the literature are: the condensers of the distillation can operate with cooling water; greater flexibility for HBPS purification; higher conversion of glycerol (>92%) and isobutene per pass (>55%); higher overall isobutene conversion with unreacted C4 cut recycling; obtaining HBPS with di- and tri-GTBE content above 95% w/w; direct use of isobutene, eliminating the need to separate it from the olefinic C4 cut.

Description of the Isooctene Stream Production Process:

The operation of the hybrid unit for the production of isooctenes is quite similar to the operation for the production of HBPS. There is a need of a higher temperature to achieve adequate conversions of isobutene and, therefore, higher pressures for the conversion reactor (R-01) to operate in liquid phase. Space velocity is higher than that used in the production of HBPS, allowing greater feed flow of olefinic C4 cut (1) and, consequently, higher productivity. For the formation of isooctene stream, the glycerol feed (2) is interrupted, there is no product recycle (5) to the reaction section, but the demineralized water (4), used in the formation of the TBA, continues to be fed. In this mode of operation, obligatorily, the unreacted C4 cut (10) obtained through the top of the product separation tower (T-02) must be recycled to the reactor in order to control the temperature of the resin catalytic bed, given the exothermicity of the reactions. The reactor effluent is sent to the product separation tower (T-02), recovering the product containing isooctenes, isododecenes and TBA by the bottom stream (11). The splitter tower (T-03) and the purification tower (T-04) do not need to operate to produce isooctenes. Likewise, unreacted C4 is sent to the sphere for its commercialization as LPG and the isooctene stream is sent to the gasoline pool or marketed as octane booster or special gasoline.

The operating conditions for the integrated process of this invention are:

Process Variable Ranges—HBPS Mode

Inlet temperature in the $1^{st}$ and/or $2^{nd}$ reactors: T=50 to 80° C.;

Isobutene/glycerol molar ratio: MR(ISO/GLI)=2 to 4:1 mol/mol;

Water/isobutene molar ratio: $MR(H_2O/ISO)$=0.03 to 0.08:1 mol/mol;

Space Velocity: LHSV (Liquid Hourly Space Velocity)=0.2 to 2.0 $h^{-1}$.

Process Variable Ranges—ISOOCTENES Mode

Inlet temperature in the $1^{st}$ and/or $2^{nd}$ reactors: T=70 to 100° C.;

Water/isobutene molar ratio: MR(H$_2$O/ISO)=0.03 to 0.08:1 mol/mol;

Space Velocity: LHSV (Liquid Hourly Space Velocity)=1.0 to 8.0 h$^{-1}$.

EXAMPLES

The following examples are presented in order to further fully illustrate the nature of the present invention and the manner of practicing the same, without, however, being considered as limiting its contents. The results of the examples described below were obtained through carrying out experimental tests in a pilot unit, changing the operation for the production of HBPS and the ISOOCTENES stream. The ranges explored of operational variables, as well as response variables such as conversions and selectivities are summarized in Table I. With the reactor effluent composition for each test, operating modes aiming at the production of HBPS and ISOOCTENES were simulated. The specification reached for HBPS is shown in Table II. In Table III are presented the mass balances for the main streams of the process for each optimized mode of operation.

Example 1: Case 1—HBPS

C4 cut from the FCC process, packed in cylinder pressurized with nitrogen, is fed to the fixed bed reactor containing Amberlyst-35 acid ion exchange resin through and a positive displacement pump. At the same time, a stream of glycerol (pharmaceutical grade with 99.5% w/w) containing a water content that confers a isobutene:water molar ratio in the range of 0.03 to 0.08 mol/mol is mixed with C4 cut before entering the catalytic bed, which is at the temperature of 60° C. and pressure of 12 bar. The unit pressure is controlled by a PSV-type valve (Pressure Switch Valve) that discharges the effluent into a phase separator vessel. The light phase (containing unreacted C4 and di- and tri-glycerol tert-butyl ethers) and the heavy phase (containing unreacted glycerol and glycerol tert-butyl monoethers) are separated and independently analyzed in order to obtain the conversions and selectivities of the process. The results obtained are shown in Table I (HBPS case).

Example 2: Case 1—ISOOCTENES

Analogously to Example 1, the test for the production of isooctenes feeds the C4 cut to the reactor through a positive displacement pump. In this case, glycerol is not fed to the process, because there is only interest in producing an isooctane stream to be used as octane booster. To facilitate the operation, instead of water, TBA (Tert-Butyl Alcohol) is fed as a reaction moderator, previously mixed with the C4 cut, in order to obtain a isobutene:water equivalent ratio in the range of 0.03 to 0.08 mol/mol. The temperature used in this example is 80 to 90° C., maintaining a pressure of 15 to 18 bar. The catalyst used was also Amberlyst-36 and the space velocity is superior to the HBPS mode, obtaining a greater production for the same volume of resin of the installed/used reactor. There was no need to recycle the unreacted C4 to the reactor, aiming at the temperature control of the bed, since it is a small reactor (pilot scale), where the removal of heat generated in the reactions, can be more efficiently removed, not giving large temperature increases. The control of pressure and effluent collection are carried out in a similar way to Example 1. However, as the effluent is in a single phase, the analysis of the composition becomes simplified. The results obtained are presented in Table I (ISOOCTENES case).

It should be noted that although the present invention has been described in relation to the attached drawings, it may be modified and adapted by persons skilled in the art, depending on the specific situation, but provided that within the inventive scope defined herein.

It should be noted that for these experiments, there is no need to wash the load to remove contaminants once that the amount of contaminants received by the catalytic bed is not enough for a significant deactivation of the resin.

In short, in the present invention the same unit, the same catalyst and the same equipment are used and, only with the variation of process conditions HBPS (used as a solvent in the formulation of cleaning products and paints) or ISOOCTENES (used as gasoline and octane booster) can be produced. The present invention has advantages for obtaining a higher final yield in terms of products and flexibility in the HBPS specification, reaching levels in the range of 95% w/w of di- and tri-GTBE.

TABLE I

Performance results of the production processes of HBPS and ISOOCTENES

| Parameter | HBPS case | ISOOCTENES case |
|---|---|---|
| Glycerol conversion | >92% | — |
| di- + tri-GTBE selectivity | >96% | — |
| Isobutene conversion | 50 to 60% | >95% |
| n-butene conversion | <2% | 3 to 5% |
| C8 and C12 selectivity | 1.0 to 2.5% | >90% |
| C8/(C8 + C12) mass ratio | 85 to 95% | 80 to 90% |

TABLE II

Specification of High Boiling Point Solvent (HBPS)

| Property | Unit | Value |
|---|---|---|
| di- + tri-GTBE content (min) | W/W | 95% |
| Boiling temperature | ° C. | >210 |
| Vapor pressure | kPa | <7.0 |

TABLE III

Process mass balance - Example 1 (HBPS) and Example 2 (ISOOCTENE)

| | | Flow (kg/h) | |
|---|---|---|---|
| Stream | Discrimination | HBPS mode | ISOOCTENE mode |
| (1) | C4 cut | 11,200 | 27,000 |
| (2) | Glycerol | 717 | — |
| (12) | LPG | 10,230 | 22,791 |
| (13) | Isooctenes (gasoline) | 154 | 4,241 |
| (15) | HBPS | 1,493 | — |

The invention claimed is:

1. An integrated production process of tert-butyl ethers of glycerol or an isooctane stream comprising:
   performing counter-current extraction of an olefinic C4 cut admitted from a bottom of a washing tower with demineralized water admitted from a top of the washing tower;

removing oily water from the bottom of the washing tower for treatment of organic effluents and directing a washed C4 cut from the top of the washing tower to a conversion reactor comprising ion exchange acid resin;

combining the washed C4 cut with a first recycle stream comprising non-converted mono-GTBE, glycerol, and water to generate a first supply stream of the conversion reactor or recycling an unreacted C4 stream from a top of a product separation tower to the conversion reactor to generate a second supply stream of the conversion reactor;

performing, in the conversion reactor, etherification reactions of glycerol with isobutene to form mono-GTBE, di-GTBE, and tri-GTBE; dimers and trimers of isobutene; and tert-butanol (TBA) by isobutene hydration;

sending an effluent from the conversion reactor to the product separation tower, which operates pressurized in the range of 2-8 bar, wherein at a bottom of the product separation tower a stream with formed products is obtained and sent to a gasoline splitter tower;

storing a top stream of the product separation tower comprising unreacted C4 hydrocarbons in LPG spheres or recycling the top stream of the product separation tower to the conversion reactor for bed temperature control or to maximize overall isobutene conversion;

obtaining from a top of the gasoline splitter tower an isooctene stream comprising isobutene dimers and trimers and TBA or the isooctene stream is recovered as a side stream of the product separation tower;

sending a stream from a bottom of the gasoline splitter tower to a purification tower, which operates under vacuum;

obtaining a second recycle stream from a bottom of the purification tower comprising mono-GTBE formed and unreacted glycerol and recycling the second recycle stream to the conversion reactor, along with glycerol and water;

forming the first recycle stream by mixing the second recycle stream with the glycerol and water;

sending a stream from a top of the purification tower comprising a minimum content of 95% w/w of di-GTBE and tri-GTBE for storage in tanks.

2. The process of claim 1, wherein an inlet temperature of the conversion reactor is in a range from 50° C. to 80° C.

3. The process of claim 1, wherein an isobutene/glycerol molar ratio is in a range from 2 to 4:1 mol/mol.

4. The process of claim 1, wherein a water/isobutene molar ratio is in a range from 0.03 to 0.08:1 mol/mol.

5. The process of claim 1, wherein a space velocity (LHSV) is in a range from 0.2 to 2.0 $h^{-1}$.

6. The process of claim 1, wherein the process operates with more than one reactor in series to maximize glycerol and isobutene conversion.

7. The process of claim 1, comprising recycling the unreacted C4 stream from the top of the product separation tower to the conversion reactor; feeding water to the conversion reactor to form TBA; and sending the isooctene stream to a gasoline pool.

8. The process of claim 7, wherein an inlet temperature in the conversion reactor is in a range from 70° C. to 100° C.

9. The process of claim 7, wherein a water/isobutene molar ratio is in a range from 0.03 to 0.08:1 mol/mol.

10. The process of claim 7, wherein a space velocity (LHSV) is in the range from 1.0 to 8.0 $h^{-1}$.

11. The process of claim 7, wherein the process operates with more than one reactor in series to maximize conversion of isobutene to isooctenes and isododecenes.

* * * * *